US010656086B2

(12) United States Patent
Uozumi (10) Patent No.: US 10,656,086 B2
(45) Date of Patent: May 19, 2020

(54) MEASUREMENT APPARATUS

(71) Applicant: CANON KABUSHIKI KAISHA, Tokyo (JP)

(72) Inventor: Takayuki Uozumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/412,895

(22) Filed: May 15, 2019

(65) Prior Publication Data

US 2019/0369018 A1  Dec. 5, 2019

(30) Foreign Application Priority Data

May 30, 2018  (JP) .................. 2018-103054

(51) Int. Cl.
   *G01N 21/55*  (2014.01)
   *G01N 21/47*  (2006.01)
(52) U.S. Cl.
   CPC ............. *G01N 21/55* (2013.01); *G01N 21/47* (2013.01)
(58) Field of Classification Search
   CPC .... G01N 21/55; G01N 21/57; G01N 21/4738; G01N 21/47
   See application file for complete search history.

(56) References Cited

U.S. PATENT DOCUMENTS

| 8,456,639 | B2 | 6/2013 | Krishnan et al. |
| 8,634,077 | B2 | 1/2014 | Hu |
| 9,528,934 | B2 | 12/2016 | Kato |
| 2006/0285111 | A1* | 12/2006 | Raymond ............ G01B 1/0616 356/364 |
| 2009/0323073 | A1* | 12/2009 | Luber ................. G01N 21/553 356/448 |

(Continued)

FOREIGN PATENT DOCUMENTS

| DE | 19821611 A1 | 11/1999 |
| JP | 2010276492 A | 12/2010 |

(Continued)

OTHER PUBLICATIONS

Extended European Search Report issued in European Appln. No. 19175300.3 dated Oct. 9, 2019.

*Primary Examiner* — Steven Whitesell Gordon
(74) *Attorney, Agent, or Firm* — Rossi, Kimms & McDowell LLP (57) ABSTRACT

A measurement apparatus measures an optical characteristic with high robustness and with a simple configuration. A measurement apparatus of the present invention measures optical characteristic of a sample. The measurement apparatus includes an irradiation unit to irradiate the sample with light emitted from a light source and transmitted through an opening member, an imaging unit to detect an image formed by the light irradiated by the irradiation unit and reflected by the sample, and a processing unit to obtain the optical characteristic of the sample on the basis of an output of the imaging unit. The opening member comprises plural openings through which the light emitted from the light source is transmitted, the irradiation unit irradiates the sample with the light transmitted through the plurality of openings, and the imaging unit detects an image formed by the light transmitted through the plurality of openings and reflected by the sample.

15 Claims, 11 Drawing Sheets

(56) References Cited

U.S. PATENT DOCUMENTS

2014/0176953 A1* 6/2014 Kato ................. G01N 21/55
    356/445
2016/0335772 A1* 11/2016 Uozumi ............ G01N 21/8422

FOREIGN PATENT DOCUMENTS

| JP | 2014126408 A | 7/2014 |
|---|---|---|
| JP | 2015184268 A | 10/2015 |
| JP | 2016211999 A | 12/2016 |
| JP | 2017156351 A | 9/2017 |

* cited by examiner

MEASUREMENT APPARATUS

BACKGROUND OF THE INVENTION

Field of the Invention

The present invention relates to a measurement apparatus for an optical characteristic.

Description of the Related Art

An optical characteristic of a surface of an object such as a printed material or a painted or plastic material is an important factor related to quality, and for example, Japanese Industrial Standards (JIS) and the International Organization for Standardization (ISO) provide standards for evaluating the optical characteristic of an object surface such as gloss or the inside (sample). As an evaluation index of the optical characteristic of an object surface, for example, there are specular gloss, image clarity, haze, and the like. As a measurement apparatus of such an optical characteristic, there is a general-purpose device that acquires a bidirectional reflectance distribution function (BRDF) and then calculates many indices at once.

Japanese Patent Laid-Open No. 2010-276492 discloses a device that uses a pinhole as a secondary light source and obtains its image by imaging elements. Since the pinhole is used as the secondary light source, even though it is possible to acquire a scattering characteristic of which an angular resolution is high, in securing a light amount, it is necessary to increase a distance between the pinhole and a collimator lens and so there is a concern that a size of the device may increase. On the other hand, Japanese Patent Laid-Open No. 2014-126408 and Japanese Patent Laid-Open No. 2016-211999 give examples of measurement apparatus in which the increase of the size of the device is suppressed. In Japanese Patent Laid-Open No. 2014-126408, a finite opening is used as a secondary light source, blur of an opening image is captured by a multi-pixel element, and so a plurality of kinds of reflection characteristics are able to be measured while suppressing the increase of the size of the device. In addition, in Japanese Patent Laid-Open No. 2016-211999, a finite opening is used as a secondary light source, and when a de-convolution operation of an opening image that is a reference and an output image by measurement is carried out, a coefficient of a Wiener filter is optimized to suppress errors.

However, in Japanese Patent Laid-Open No. 2014-126408 and Japanese Patent Laid-Open No. 2016-211999, although it is possible to suppress the increase in the size of the device, an operation process is complicated and so robustness is low.

SUMMARY OF THE INVENTION

The present invention provides a measurement apparatus that measures an optical characteristic with high robustness and with a simple configuration.

In order to solve the problems described above, a measurement apparatus according to one embodiment of the present invention is a measurement apparatus to measure an optical characteristic of a sample, which comprises, an irradiation unit configured to irradiate the sample with light emitted from a light source and transmitted through an opening member, an imaging unit configured to detect an image formed by light irradiated by the irradiation unit and reflected by the sample, and a processing unit configured to obtain the optical characteristic of the sample on the basis of an output of the imaging unit, wherein the opening member is provided with a plurality of openings, and the irradiation unit irradiates the sample with the light transmitted through the plurality of openings, and the imaging unit detects an image formed by the light transmitted through the plurality of openings and reflected by the sample.

According to the present invention, a measurement apparatus that measures an optical characteristic with high robustness and with a simple configuration is provided.

Further features of the present invention will become apparent from the following description of exemplary embodiments with reference to the attached drawings.

DESCRIPTION OF THE EMBODIMENTS

Hereinafter, exemplary embodiments for carrying out the present invention will be described with reference to the drawings and the like.

First Exemplary Embodiment

Figure 1A:
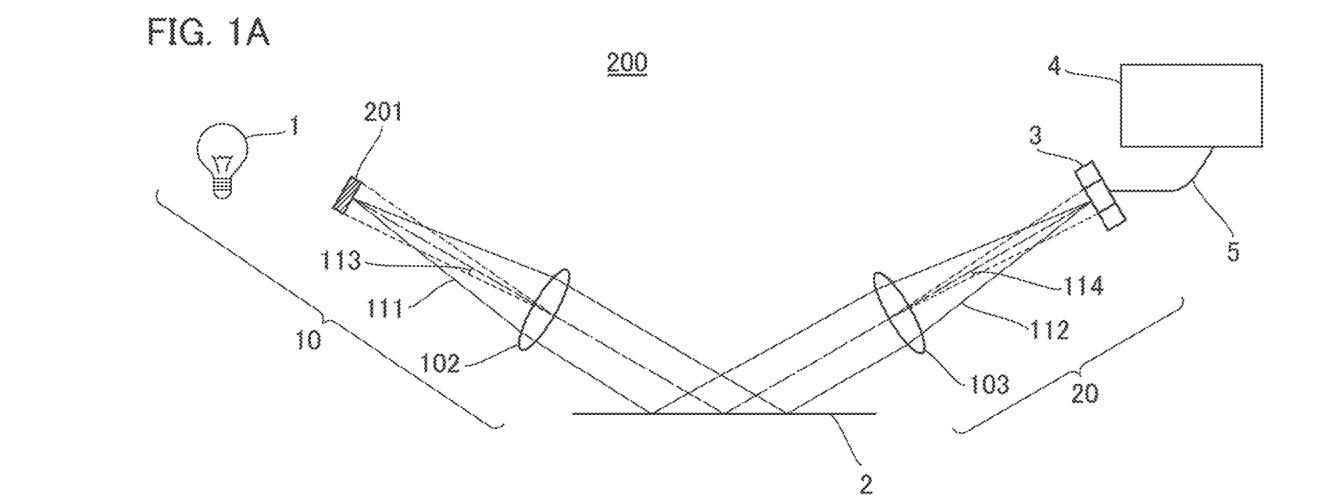
FIGS. 1A to 1E are diagrams for explaining a configuration of a measurement apparatus of an optical characteristic according to a first exemplary embodiment.

FIGS. 1A to 1E are diagrams for explaining a configuration of a measurement apparatus 200 for an optical characteristic according to a first exemplary embodiment. FIG. 1A is a schematic configuration diagram of the measurement apparatus 200 for the optical characteristic according to the present exemplary embodiment. The measurement apparatus 200 includes an irradiation unit 10 that is a light projection system, an imaging unit 20 that is a light receiving system, and a processing unit 4. The irradiation unit 10 includes a light source 1, an opening member 201, and a lens 102.

The light source 1 irradiates an opening of the opening member 201 through, for example, an optical system (not shown). For example, an LED is adopted as the light source 1. For example, the light source 1 is selected so as to emit light substantially coincides with light defined by a combination of a CIE standard light D65 and a photopic luminous efficiency function V(λ), and adding a spectral sensitivity characteristic of a light receiving unit 3 that will be described later. In a case in which a wavelength band determined to be effective is determined in advance, the light source 1 may be selected according to that band.

The opening member 201 includes a plurality of openings. Details of the opening member 201 will be described later. An opening angle 113 is an opening angle of the opening of the opening member 201 in a case in which the opening member 202 is viewed from the lens 102 side (that is, an opening angle on a projected side). A light flux from the opening member 201 becomes a substantially parallel light flux by the lens 102 and is irradiated to the sample 2.

The imaging unit 20 includes a lens 103 and the light receiving unit 3. The imaging unit 20 acquires an image of the light emitted from the irradiation unit 10 and reflected by the sample 2.

The lens 103 is configured to receive light 111 emitted from the lens 102 and specular-reflected by the sample 2 as specular reflection light 112. An opening angle 114 is an opening angle (an opening angle of a light receiving side) of light reaching a light receiving region of the light receiving unit 3 from the lens 103, and is determined by a product of an optical magnification of an optical system and the opening angle 113 of a light projection side. It is preferable that the opening 201 and the light receiving unit 3 are in an optically conjugate relationship.

The light receiving unit 3 may include a solid-state imaging device having, for example, a CCD or CMOS structure. In particular, a structure in which each of elements is arranged in matrix is desirable. The light receiving unit 3 is connected to a processing unit 4 (an operation device) through an electric cable 5.

The light incident on the light receiving unit 3 is photo-electrically converted to signals for each pixel (for each element), and the electric signals are transmitted to the processing unit 4. The processing unit 4 obtains the optical characteristic such as a scattering characteristic (e.g. BRDF) based on an input signal. The processing unit 4 may be configured to include a computer (or an information processing device including a device such as a CPU configured by a processor), but the processing unit 4 is not limited thereto.

Figure 1B:
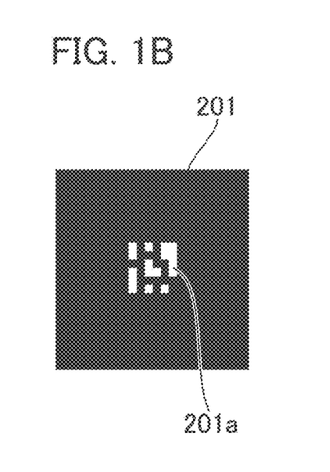

In this context, details of the opening member 201 will be described. FIG. 1B is a diagram showing a plurality of openings 201a included in the opening 201 according to the first exemplary embodiment. A white portion is the opening 201a through which light passes. Since the opening 201a is formed in the opening member 201, an actual shape of the opening 201a is a three-dimensional shape including a thickness of the opening member 201. However, in the present exemplary embodiment, for convenience of description, in a case of "the shape of the opening 201a", the shape means a planar shape of the opening 201a viewed along a plane direction of a surface having the opening 201a of the opening member 201.

As shown in the figures, the opening member 201 of the present exemplary embodiment includes openings 201a having a plurality of different shapes. For example, it is desirable that the opening member 201 has a combination of openings 201a of more complicated and different shapes such as including an opening 201a of a shape having a convex portion, including an opening 201a of a shape having five or more corners such as a pentagon or a hexagon, or the like.

Note that, the opening member 201 may include a triangular opening 201a. In addition, it is preferable that the configuration of the opening member 201 including the shape and disposition of the opening 201a has only one axis of line symmetry or is rotationally symmetric only in relation to two rotation angles of 180 degrees and 360 degrees.

Figure 1C:
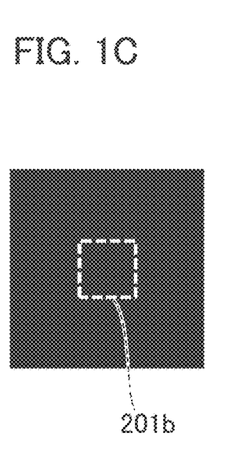

FIG. 1C is a diagram showing an opening range 201b that is a range in which the opening 201a is formed in the opening member 201. In the present exemplary embodiment, a plurality of openings 201a having a desired shape are formed by dividing the opening range 201b shown by a dotted line into 6×6 regions and opening only some of the plurality of regions.

Figure 1D:
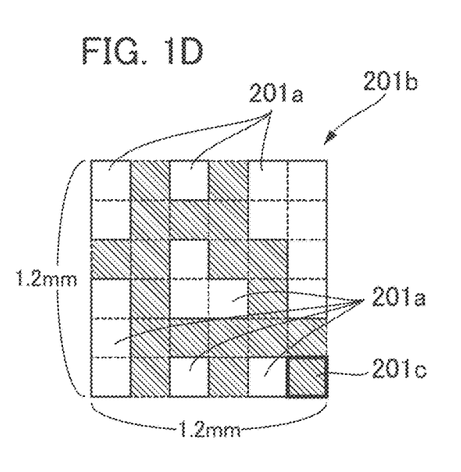

FIG. 1D is a schematic diagram in which the plurality of openings 201a are formed in the opening region 201b. For example, in a case in which it is assumed that a size of the opening region 201b is 1.2 [millimeter]×1.2 [millimeter], a size of each region 201c divided into 6×6 is 0.2 [millimeter]×0.2 [millimeter]. In a case in which a metal plate such as aluminum is used as the opening member 201, such an opening is able to be formed by etching, laser processing, or the like.

In addition, in a case in which a glass plate or the like with a metal film such as chromium deposited on the glass plate or the like is used as the opening member 201, it is possible to form such an opening by etching the metal film.

In the present application, the term "opening" is used with an optical meaning. Therefore, in the present exemplary embodiment, a portion of the opening member 201 that plays a role of transmitting the light emitted from the light source 1 is referred to as the "opening 201a". On the other hand, a portion of the opening member 201 other than the opening 201a plays a role of shielding the light emitted from the light source 1.

In a case in which the size of the opening range 201b is considered as a representative size of the opening, the opening angle 113 on the projection side is determined by a combination of the size of the opening range 201b and a focal distance of the lens 102. For example, since the length of one side of the opening range 201b is 1.2 [millimeter] as described above, in a case in which it is assumed that the focal distance of the lens 102 is 36 [millimeter], arctan(1.2/36)=1.9[°] ('arctan' indicates arctangent) is satisfied. This is interpreted as a resolution of an incident angle. In the present exemplary embodiment, an opening in which a size in an in-plane direction of an incident surface is equal to a size in a direction perpendicular to the incident surface is adopted, but in a case in which the resolution in the in-plane direction of the incident surface is required, the size of the opening in the in-plane direction of the incident surface may be limited. In this case, it is possible to secure the light amount by providing a rectangular opening range.

In the present exemplary embodiment, the opening 201a is formed by combining the regions 201c of the same size, however, in a case in which the plurality of openings 201a are formed in one opening member 201, the opening 201a may be configured to include elements of different sizes. The shape of the opening 201a shown in FIGS. 1B and 1D is merely an example, and other combinations are able to be used. In addition, in the present exemplary embodiment, although the combination of the rectangular openings is described as an example, a combination of circles, arbitrary polygons, and shapes drawn with arbitrary closed curves may be used.

Next, a method of measuring the optical characteristic of the sample 2 by the measurement apparatus 200 will be described. The lens 102 is disposed so that the light flux emitted from the opening member 201 becomes substantially parallel light, that is, substantially coincides with the focal distance. The light flux projected from the lens 102 is diffusely reflected on the surface of the sample 2 according to the BRDF of the sample 2. At this time, a size of a cross section of the substantially parallel light flux is determined by a lens holder (not shown) or the like. For example, in a case in which it is assumed that a size of the lens holder is 10 [millimeter]×10 [mm], a light flux having the same section size is projected. In a case in which the incident angle is, for example, 60[°], the size of the cross section of the light flux on the surface of the sample 2 is 20 [millimeter]×10 [millimeter]. The measured optical characteristic is an average value in a region where the light flux is diffusely reflected.

Therefore, in a case in which the desired size of the measurement region is determined in advance, it is possible to appropriately adjust the size of the cross section of the light flux to be projected by the shape of the lens holder. It is also possible to adopt a configuration in which the size of the cross section of the light flux to be projected is able to be selected by providing opening parts having a plurality of sizes. Note that, for convenience of description, an example in which the incident angle is 60[°] is described, however, for example, it is possible to adopt an optical system in which the incident angle and the light receiving angle can be variably set by providing a movable portion (not shown). In addition, note that it is also possible to configure an optical system having a plurality of incident angles and light receiving angles by integrally configuring a plurality of optical systems in advance.

A part of the light flux diffusely reflected by the surface of the sample 2 is collected by the lens 103 and is incident on the light receiving unit 3. The opening angle 114 on the light receiving side is determined by the focal distance of the lens 103 and the size of the effective region of the light receiving unit 3. For example, considering a case in which the focal distance of the lens 103 is set to 36 [millimeter] as in the case of the lens 102 and the size of the effective region of a light receiver is 5 [millimeter]×5 [millimeter], the opening angle 114 of the light receiving side is arctan(5/36) =7.9[°]. This parameter is also able to be appropriately changed based on information of the desired opening angle, the size of the light receiver to be used, and the like.

Figure 1E:
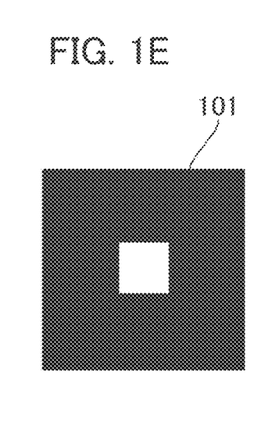

In this context, a method of acquiring an optical characteristic according to the related art (that is, a comparative example) will be described. A measurement apparatus according to the related art is different from the measurement apparatus 200 according to the present exemplary embodiment in the configuration of the opening member. FIG. 1E is a schematic diagram of an opening member 101 according to the related art. A white portion shows an opening through which light passes. In the measurement apparatus according to the related art, one rectangular opening is used.

Figure 2:
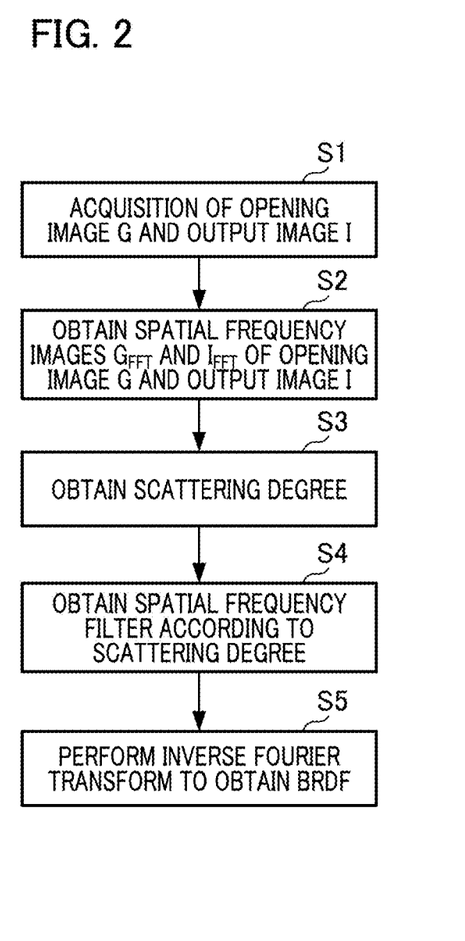
FIG. 2 is a diagram for explaining a flow for acquiring a BRDF performed by a processing unit.

FIG. 2 is a diagram for explaining a flow for acquiring the BRDF performed by the processing unit 4.

In step S1, an opening image G(x, y), which is information of the opening of the opening member 101, and an output image I(x, y), which is the image of the opening obtained by the light flux diffusely reflected by the sample 2 and detected by the imaging unit 20, are acquired. The opening image G is used as a reference image, so, for example, an image measured by using a specular surface as the sample 2 or an image obtained by directly imaging the opening by another imaging unit is adapted. Otherwise, information about a design value which is acquired in advance may be used as the opening image G.

In step S2, a Fourier transform is performed on each of the opening image G and the output image I to obtain a spatial frequency image $G_{FFT}$ of the opening image G and a spatial frequency image $I_{FFT}$ of the output image I. A relationship between the spatial frequency images $G_{FFT}$, $I_{FFT}$ and the BRDF that is one of the optical characteristics is able to be expressed by the following relational expression.

$$B_{FFT} = \sum_{n=0}^{N_n-1} \sum_{m=0}^{N_m-1} \frac{I_{FFT}(m, n)}{G_{FFT}(m, n)} \exp\left[\frac{-i2\pi N_{m0}}{N_m} + \frac{-i2\pi N_{n0}}{N_n}\right] \quad \text{Expression (1)}$$

In this context, $N_m$ is the number of pixels in a vertical direction of the light receiving unit 3 and $N_n$ is the number of pixels in a horizontal direction of the light receiving unit 3. $N_{m0}$ and $N_{n0}$ are constants to determine center coordinates of the BRDF. $B_{FFT}$ is a spatial frequency image of the BRDF. In the form of Expression 1, since the opening of the opening member 101 has a rectangular shape, $G_{FFT}(m, n)$ may have a value of 0 and diverge in calculation. As a means for avoiding this, a Wiener filter is used.

$$B_{FFT} = \sum_{n=0}^{N_n-1} \sum_{m=0}^{N_m-1} \frac{I_{FFT}(m, n)}{G_{FFT}(m, n)} \quad \text{Expression (2)}$$

$$\frac{|G_{FFT}|^2}{|G_{FFT}|^2 + c} \exp\left[\frac{-i2\pi N_{m0}}{N_m} + \frac{-i2\pi N_{n0}}{N_n}\right]$$

In Expression (2), "c" is a Wiener coefficient, and a gain of the filter is changed by "c". Then, in step S3, a scattering degree is obtained, and, in step S4, a spatial frequency filter (i.e. Wiener filter) is determined based on the scattering degree obtained in step S3. In step S5, a Fourier transform is performed on the BRDF of a frequency space to convert the BRDF to a real space.

$$B = FFT^{-1}(B_{FFT}) \quad \text{Expression (3)}$$

In Expression (3), "B" is the BRDF of the sample 2. Although B as the BRDF is originally a non-negative value, a negative value may appear as a result of calculation according to Expression (3). In a case in which an appropriate filter is selected, the negative value takes a small value. Therefore, even if the BRDF of negative value is converted to a BREF of non-negative value (that is, calculating a rounding figure of the BRDF followed by obtaining an absolute figure of the calculation result), its influence is negligible. In this way, the BRDF is able to be obtained.

FIGS. 3A to 3H are diagrams showing examples of a BRDF acquisition results by the measurement apparatus according to the related art.

Figure 3A:
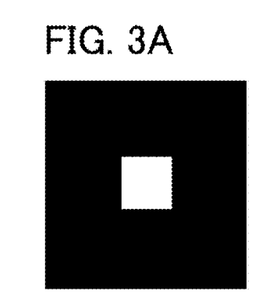
FIGS. 3A to 3H are diagrams showing an example of a BRDF acquisition result by a measurement apparatus according to the related art.
Figure 3B:
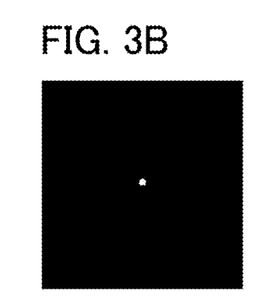

FIG. 3A is a diagram showing an opening image G of the opening member 101. FIG. 3B is a diagram showing the BRDF of the sample 2.

In FIG. 3B, a vertical direction corresponds to the in-plane direction of the incident surface, a horizontal direction corresponds to the direction perpendicular to the vertical direction, and the range corresponds to the opening angle 114 on the light receiving side shown in FIG. 1. In addition, a white portion means that the value of the BRDF is large, and a black portion means that the value of the BRDF is small. In FIG. 3B, in order to clearly display the figure, binarized data is shown. An actual distribution is, for example, a continuous amount that smoothly changes according to the Gaussian distribution. These also applies to other figures.

Figure 3C:
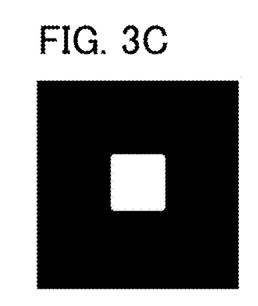

FIG. 3C is a diagram showing the output image I of the opening member 101 acquired through the sample 2.

Figure 3D:
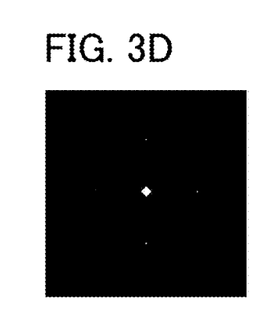
Figure 3E:
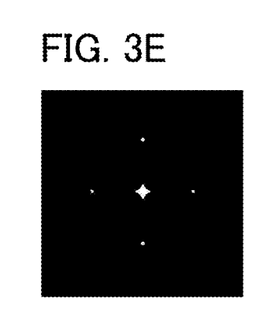
Figure 3F:
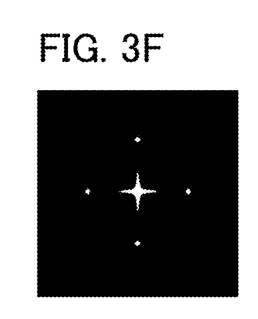
Figure 3G:
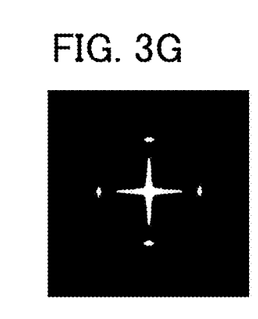
Figure 3H:
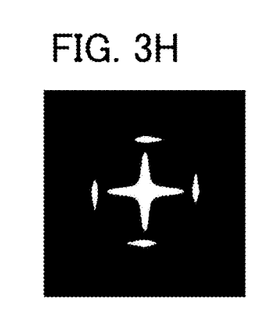

FIGS. 3D to 3H are diagrams showing BRDF calculation values obtained when the value of the Wiener coefficient "c" is changed. FIG. 3D corresponds to $c=10^{-6}$, FIG. 3E corresponds to $c=10^{-5}$, FIG. 3F corresponds to $c=10^{-4}$, FIG. 3G corresponds to $c=10^{-3}$, and FIG. 3H corresponds to $c=10^{-2}$. In a case in which the optical characteristic is obtained using the measurement apparatus according to the related art, $c=10^{-6}$ is selected, and the BRDF shown in FIG. 3D is obtained. It can be seen that this coincides most closely with the BRDF of the sample 2 shown in FIG. 3B among FIGS. 3D to 3H.

On the other hand, the larger the Wiener coefficient "c", the larger an error is. Referring to FIGS. 3E to 3H, a significant error starts to occur at $c=10^{-4}$ of FIG. 3F, and a larger error occurs in FIGS. 3G and 3H.

FIGS. 4A to 4H are diagrams showing an example of the BRDF acquisition result by the measurement apparatus according to the related art in a case in which the sample 2 having higher diffusion is used.

Figure 4A:
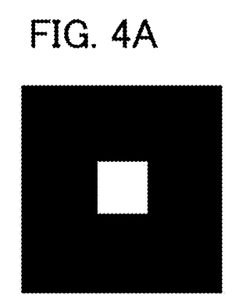
FIGS. 4A to 4H are diagrams showing an example of the BRDF acquisition result by the measurement apparatus according to the related art in a case in which a sample having higher diffusion is used.
Figure 4B:
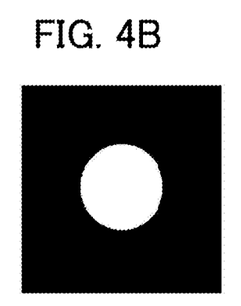
Figure 4C:
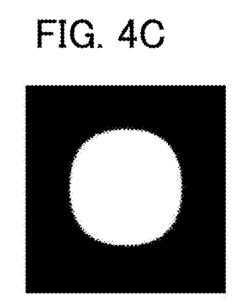

FIG. 4A is a diagram showing the opening image G of the opening 101 member. FIG. 4B is a diagram showing the BRDF of the sample 2 having strong diffusion.

Figure 4D:
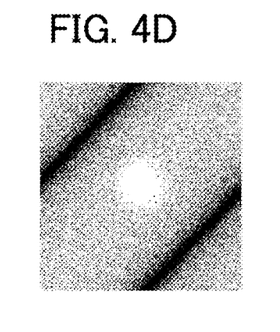
Figure 4E:
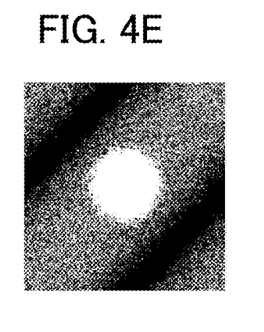
Figure 4F:
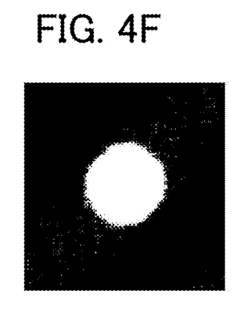
Figure 4G:
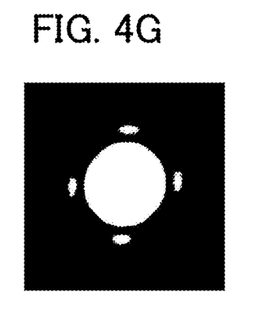
Figure 4H:
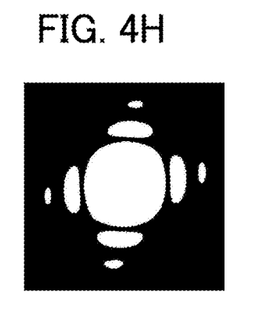

FIGS. 4D to 4H are diagrams showing the BRDF calculation values obtained when the value of the Wiener coefficient "c" is changed. FIG. 4D corresponds to $c=10^{-6}$, FIG. 4E corresponds to $c=10^{-5}$, FIG. 4F corresponds to $c=10^{-4}$, FIG. 4G corresponds to $c=10^{-3}$, and FIG. 4H corresponds to $c=10^{-2}$. In this case, FIG. 4F in which $c=10^{-4}$ best reproduces the BRDF (FIG. 4B) of the sample 2 having the strong diffusion and the error is larger in a case in which other values of the Wiener coefficient "c" are adopted. As described above, in the measurement apparatus according to the related art, it is possible to calculate a desired BRDF by selecting an optimum Wiener coefficient, but the robustness against the selection of the Wiener coefficient c is low.

Next, a case in which the method of acquiring the optical characteristic according to the related art described above is applied to the measurement apparatus 200 having the opening member 201 according to the present exemplary embodiment will be described.

FIGS. 5A to 5H are diagrams showing an example of the BRDF acquisition result by the measurement apparatus 200 according to the first exemplary embodiment.

Figure 5A:
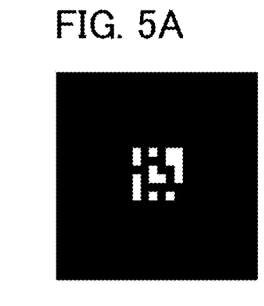
FIGS. 5A to 5H are diagrams showing an example of the BRDF acquisition result by the measurement apparatus according to the first exemplary embodiment.

FIG. 5A is a diagram showing the opening image G reflecting the opening member 201. FIG. 5A is an image measured by using a specular surface as the sample 2. The opening 201a shown in FIG. 1B is irradiated with light from the light source 1 and thereby an image is formed on the light receiving unit 3 through the sample 2.

Figure 5B:
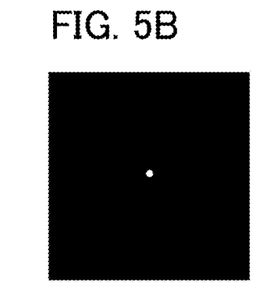

FIG. 5B is a diagram showing the BRDF of the sample 2. In FIG. 5B, a vertical direction corresponds to the in-plane direction of the incident surface, a horizontal direction corresponds to the direction perpendicular to the vertical direction, and the range corresponds to the opening angle 114 on the light receiving side. When the sample 2 having the BRDF as shown in FIG. 5B is used, the output image I shown in FIG. 5C is obtained.

The sample 2 used in a case of FIGS. 5B to 5H is the same as the sample 2 used in the example of FIGS. 3B to 3H according to the related art. Therefore, the BRDF shown in FIG. 5B is the same as the BRDF of the example of FIG. 3B according to the related art.

Figure 5C:
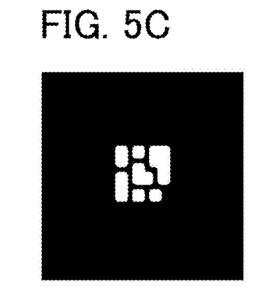

Comparing FIG. 5A with FIG. 5C, there is a difference in an edge portion of the opening 201a. This reflects a state in which the light is scattered by the BRDF of the sample 2. A light amount distribution shown in FIG. 5C is photo-electrically converted by the light receiving unit 3 and then transmitted to the processing unit 4 via the electric cable 5, and the processing unit 4 acquires the BRDF. In the processing unit 4, the BRDF is acquired from the information of FIGS. 5A and 5C.

Figure 5D:
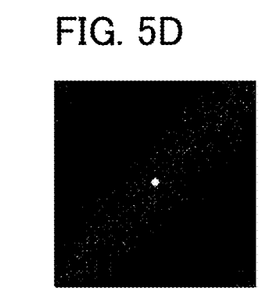
Figure 5E:
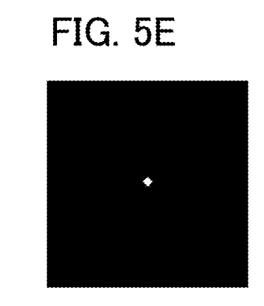
Figure 5F:
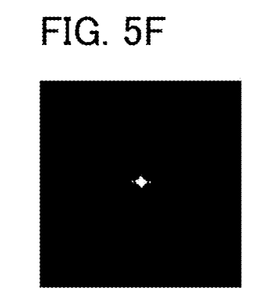
Figure 5G:
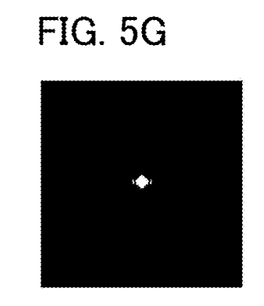
Figure 5H:
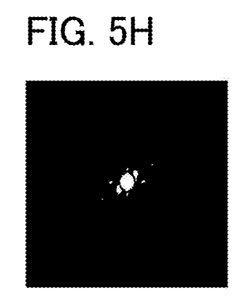

FIGS. 5D to 5H are diagrams showing the BRDF calculation values obtained when the value of the Wiener coefficient c is changed. FIG. 5D corresponds to $c=10^{-6}$, FIG. 5E corresponds to $c=10^{-5}$, FIG. 5F corresponds to $c=10^{-4}$, FIG. 5G corresponds to $c=10^{-3}$, and FIG. 5H corresponds to $c=10^{-2}$. In a case in which the BRDF acquisition result (FIGS. 5D to 5H) by the measurement apparatus 200 according to the present exemplary embodiment is compared with the BRDF acquisition result (FIGS. 3D to 3H) by the measurement apparatus according to the related art, it can be seen from the results shown in FIGS. 5D to 5H that the robustness is obviously high with respect to the Wiener coefficient "c". In the case of FIGS. 3D to 3H, the optimum value of the Wiener coefficient is only the case in which $c=10^{-6}$ (FIG. 3D), but in the case of FIGS. 5D to 5H, it is possible to realize acquisition of a reasonable BRDF within a range of $10^{-6}$ to $10^{-3}$ (FIGS. 5D to 5G).

FIGS. 6A to 6H are diagrams showing an example of the BRDF acquisition result by the measurement apparatus 200 according to the first exemplary embodiment in a case in which the sample 2 having higher diffusion is used.

Figure 6A:
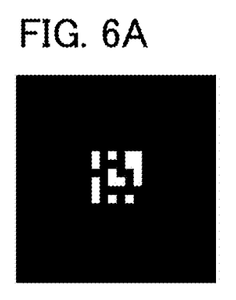
FIGS. 6A to 6H are diagrams showing an example of the BRDF acquisition result by the measurement apparatus according to the first exemplary embodiment in a case in which the sample having higher diffusion is used.
Figure 6B:
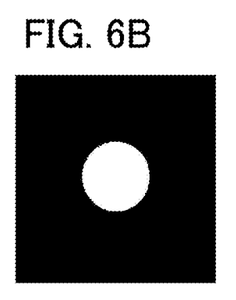
Figure 6C:
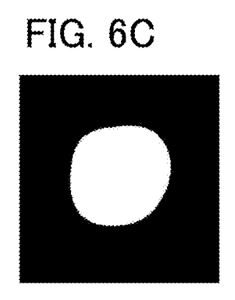

FIG. 6A is a diagram showing the opening image G of the opening member 201. FIG. 6B is a diagram showing the BRDF of the sample 2 having a strong diffusion.

Figure 6D:
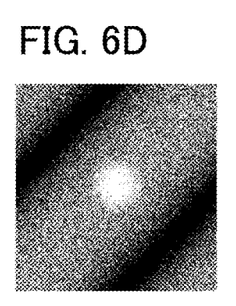
Figure 6E:
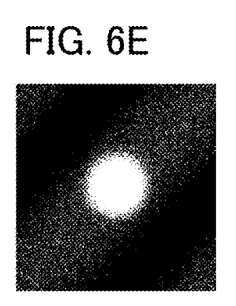
Figure 6F:
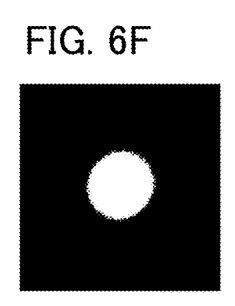
Figure 6G:
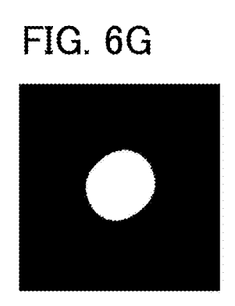
Figure 6H:
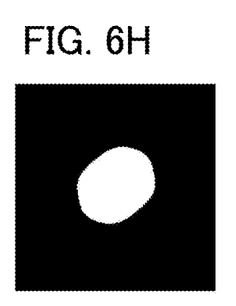

Since the sample 2 used in FIGS. 6A to 6H is the same as the sample 2 used in FIGS. 4A to 4H, the BRDF shown in FIG. 6B is the same as the BRDF of the example in FIG. 4B according to the related art. FIGS. 6D to 6H are diagrams showing the BRDF calculation values obtained when the value of the Wiener coefficient "c" is changed. FIG. 6D corresponds to $c=10^{-6}$, FIG. 6E corresponds to $c=10^{-5}$, FIG. 6F corresponds to $c=10^{-4}$, FIG. 6G corresponds to $c=10^{-3}$, and FIG. 6H corresponds to $c=10^{-2}$.

Comparing FIGS. 6D to 6H with FIGS. 4D to 4H, similar to the comparison between FIGS. 5D to 5H and FIGS. 3D to 3H, it can be seen from the results shown in FIGS. 6D to 6H that the robustness is obviously high with respect to the Wiener coefficient "c". In the case of FIGS. 4D to 4H, the optimum value of the Wiener coefficient is only the case in which $c=10^{-4}$ (FIG. 4F), but in the case of FIGS. 6D to 6H, it is possible to realize acquisition of a reasonable BRDF within a range of $10^{-5}$ to $10^{-2}$ (FIGS. 6E to 6H).

Figure 7A:
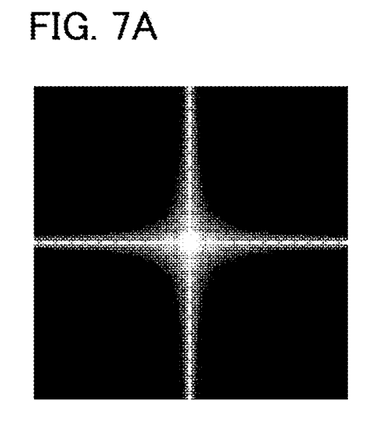
FIGS. 7A and 7B are diagrams showing a power spectrum of $G_{FFT}$ of Expression (2).
Figure 7B:
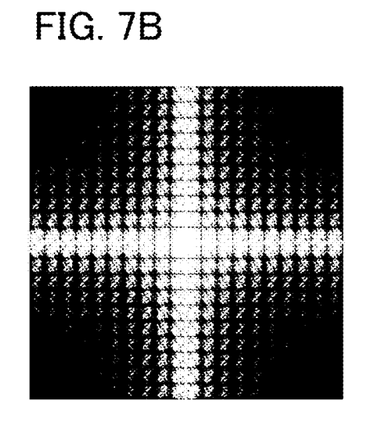

Hereinafter, a principle for improving the robustness by using the opening member 201 will be described. FIGS. 7A and 7B are diagrams showing a power spectrum of $G_{FFT}$ of Expression (2). FIG. 7A corresponds to the case of FIGS. 3A to 3E using the measurement apparatus according to the related art, and FIG. 7B corresponds to the case of FIGS. 5A to 5E using the measurement apparatus 200 according to the present exemplary embodiment.

In FIGS. 7A and 7B, a center of the figure corresponds to a direct current component, and the spatial frequency becomes higher toward the outside. A portion with high strength is displayed in white. A black portion in the figure has a value close to 0. Expression (2) means division by $G_{FFT}$, and the Wiener coefficient "c" is used to prevent divergence in the black portion.

Comparing FIG. 7A with FIG. 7B, it can be seen that, in the case of using the measurement apparatus 200 according to the present exemplary embodiment (FIG. 7B), there are many white portions which are not 0 and do not easily diverge. This is a factor by which the opening member 201a used in the present exemplary embodiment improves the robustness to the value of the Wiener coefficient.

As described above, it can be seen that by adopting the opening 201a as shown in FIG. 1B, it is possible to realize the acquisition of a highly robust BRDF with respect to the selection of the Wiener coefficient as compared with a case in which adopting the simple rectangular shape according to the related art. The Wiener coefficient is introduced to prevent divergence in a case in which $G_{FFT}(m, n)$ of Expression (1) has a value of 0. In a case in which the opening shape adopted this time is used, since it is possible to reduce the frequency of the value of $G_{FFT}(m, n)$ becoming the value of 0, it is possible to suppress divergence in calculation regardless of the value of the Wiener coefficient "c", and the robustness is improved.

As described above, by adopting the plurality of divided openings shown in the present invention to the opening member, it is possible to acquire the highly robust BRDF. Furthermore, it is also possible to fix the Wiener coefficient by using the opening member 201 of the present exemplary embodiment.

Figure 8:
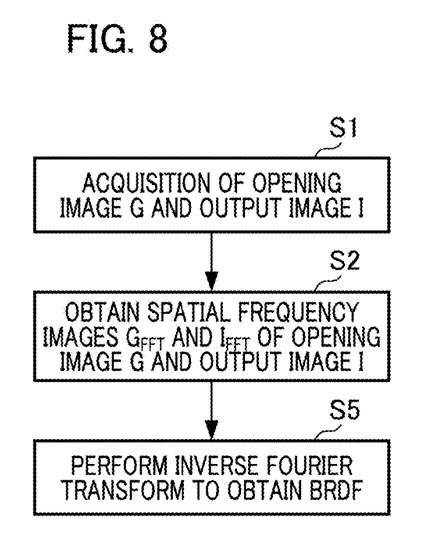
FIG. 8 is a diagram for explaining a flow for acquiring the BRDF in a case in which a Wiener coefficient is fixed.

FIG. 8 is a diagram for explaining a flow for acquiring the BRDF in a case in which the Wiener coefficient is fixed. By applying the Wiener coefficient that is determined in advance, it is possible to omit a step (steps S3 and S4 in FIG. 2) for selecting the Wiener coefficient according to the scattering.

Since steps S1 and S2 are the same as those described with reference to FIG. 2, description thereof will be omitted.

In a case in which the Wiener coefficient is fixed, in step S5, a Wiener filter is configured using a coefficient that is determined in advance. Here, as an example, it is assumed that $c=10^{-4}$. Next, after performing a filtering process, an inverse Fourier transform is performed to acquire the BRDF in the real space. As described above, by simplifying the acquisition process, it is possible to reduce a process time of the measurement apparatus 200.

FIGS. 9A to 9E are diagrams for explaining the shape and the disposition of the plurality of openings 201a.

Figures 9A, 9B:
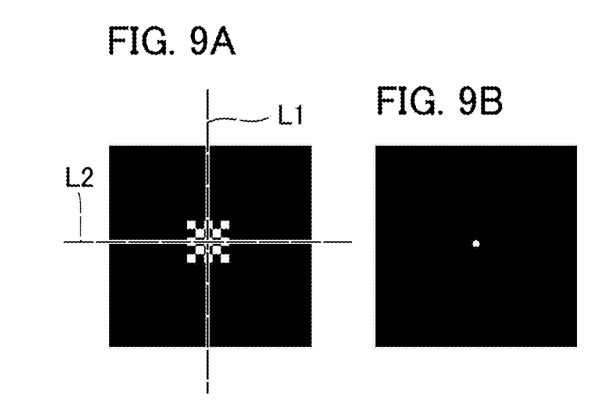
FIGS. 9A to 9H are diagrams for explaining the shape and the disposition of a plurality of openings.

FIG. 9A is a diagram showing the opening image G reflecting an opening having a shape and a disposition different from those of the above-described opening 201a of the opening member 201. The opening member of the opening image G shown in FIG. 9A is formed of a plurality of the same rectangular shapes, and a configuration of the opening member including the shape and the disposition of the opening is line symmetric with an axis L1 and an axis L2 set as symmetrical axes. The opening shown in FIG. 9A is irradiated with light from the light source 1 and thereby an image is formed on the light receiving unit 3 through the sample 2.

Figure 9C:
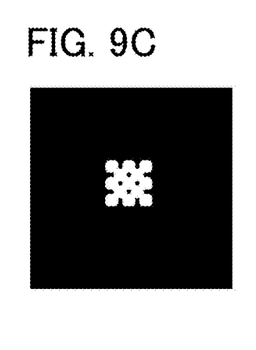

FIG. 9B is a diagram showing the BRDF of the sample 2. When the sample 2 having the BRDF as shown in FIG. 9B is used, the output image "I" shown in FIG. 9C is obtained.

The sample 2 used in the case of FIGS. 9A to 9H is the same as the sample 2 used in FIGS. 5A to 5H. Therefore, the BRDF shown in FIG. 9B is the same as the BRDF of FIG. 5B.

Figure 9D:
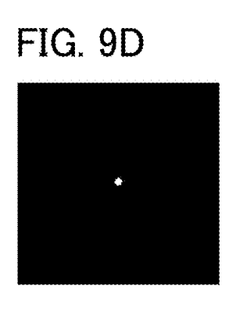
Figure 9E:
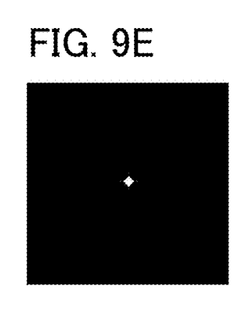
Figure 9F:
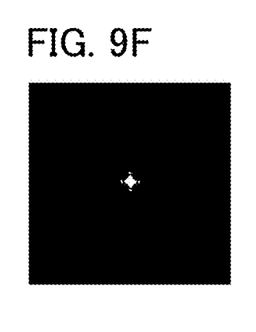
Figure 9G:
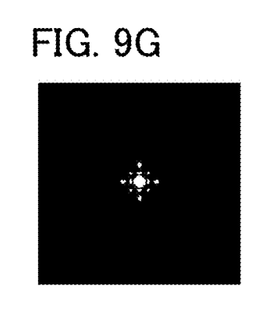
Figure 9H:
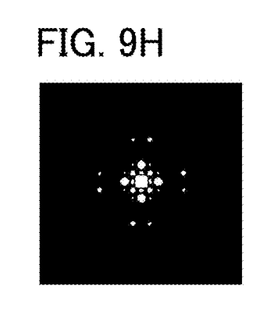

FIGS. 9D to 9H are diagrams showing the BRDF calculation values obtained when the value of the Wiener coefficient "c" is changed. FIG. 9D corresponds to $c=10^{-6}$, FIG. 9E corresponds to $c=10^{-5}$, FIG. 9F corresponds to $c=10^{-4}$, FIG. 9G corresponds to $c=10^{-3}$, and FIG. 9H corresponds to $c=10^{-2}$. From FIGS. 9D to 9H, in particular, in the case of FIGS. 9G and 9H, the error becomes large. This is because a distribution reflecting the symmetry is generated in a strength distribution in the frequency space described by $G_{FFT}(m, n)$ of the above-described Expression (1) and thus its influence appears in the BRDF acquisition result.

On the other hand, the plurality of openings 201a shown in FIG. 1B include two or more openings of different shapes, and in a case of viewing a whole, the shape and the disposition of the plurality of openings 201a do not have any axis of line symmetry, that is, are not line symmetric with respect to any central axis. In other words, the opening member (including the plurality of openings) has an asymmetric shape (a shape which is neither line symmetric nor point symmetric nor rotationally symmetric) as a whole including the position or the shape of each opening. In addition, the plurality of openings 201a also include an L-shaped opening having a convex shape portion that is a shape other than a rectangle. Note that "the opening having the convex shape portion" includes not only a shape in which a center side protrudes beyond both sides but also a shape in which only one side protrudes from the other side such as an L shape. The reason for adopting such the opening portion 201 is that there is no large error in the calculation result of the BRDF due to the strength distribution caused by symmetry or the like in the frequency space not occurring. As described above, with respect to the shape and the disposition of the plurality of openings 201a, in order to realize the BRDF operation with a small error, a case of which the axis of the line symmetry is one or less, is provided, the opening has the convex shape portion other than a simple rectangular shape, the shapes of each of the openings are different from each other, and the like is preferable.

Second Exemplary Embodiment

Hereinafter, a measurement apparatus of an optical characteristic according to a second exemplary embodiment will be described. The matters that are not mentioned as the second exemplary embodiment follow the first exemplary embodiment. The opening member of the second exemplary embodiment has an opening of non-line-symmetric shape. In this context, the "non-line-symmetric shape" means a shape having no central axis that is an axis of line symmetry. Note that, in the measurement apparatus for the optical characteristic according to the second exemplary embodiment, the configuration other than the opening member is similar to that of the first exemplary embodiment. In addition, also in the present exemplary embodiment, for convenience of description, the "shape of the opening" means a plane shape of the opening when viewed along the direction of the surface having the opening of the opening member.

Figure 10A:
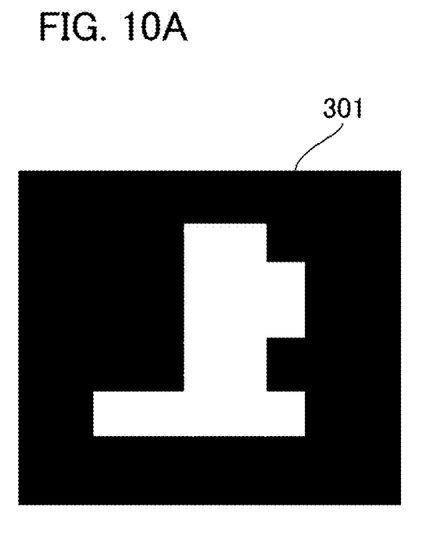
FIGS. 10A and 10B are enlarged views of an opening image according to a second exemplary embodiment.
Figure 10B:
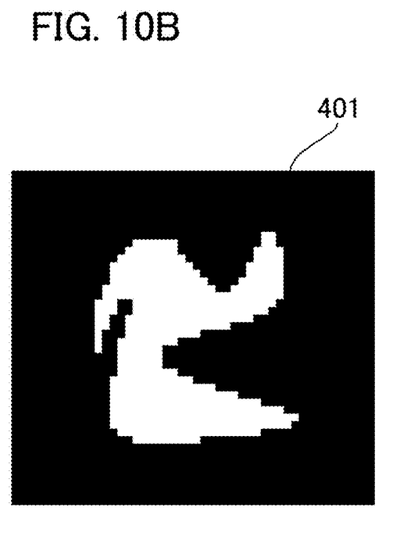

FIGS. 10A and 10B are enlarged views of the opening image G according to the second exemplary embodiment. FIG. 10A is a diagram showing an example of an opening member 301 having one opening surrounded by a line segment. The opening of the opening member 301 is the non-line-symmetric shape surrounded by a plurality of line segments. The line segment means a part of a line that is bounded by two distinct end points. In addition, the opening of the opening member 301 includes an unevenness of different shapes. Note that, in this context, the "unevenness of the different shapes" includes not only a case in which sizes or shapes in the unevenness are different from each other but also a case in which directions in which convex portions protrude are different from each other or directions in which concave portions are recessed are different from each other.

FIG. 10B shows an example of an opening member 401 having one opening including a curve. The opening of the opening member 401 includes the curve and is a non-line-symmetric shape. In addition, similarly, the opening of the opening member 401 also includes an unevenness of different shapes.

Figure 11A:
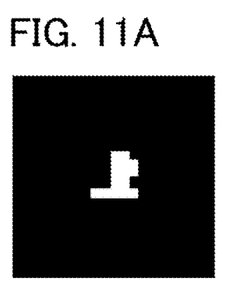
FIGS. 11A to 11H are diagrams showing an example of the BRDF acquisition result using an opening according to the second exemplary embodiment.
Figure 11B:
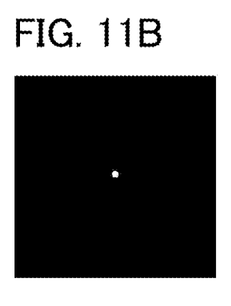

FIGS. 11A to 11H are diagrams showing an example of the BRDF acquisition result using the opening 301 (refer to FIG. 10A) according to the second exemplary embodiment. FIG. 11A is a diagram showing the opening image G reflecting the opening member 301. FIG. 11B is a diagram showing the BRDF of the sample 2.

Note that, the sample 2 used in a case of FIGS. 11A to 11H is the same as the sample 2 used in FIGS. 3A to 3H and FIGS. 5A to 5H according to the first exemplary embodiment. Therefore, the BRDF shown in FIG. 11B is the same as the BRDF of FIG. 3B and FIG. 5B according to the first exemplary embodiment.

Figure 11C:
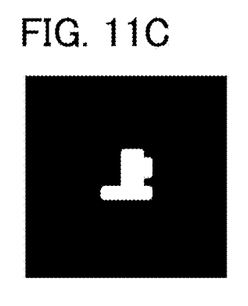
Figure 11D:
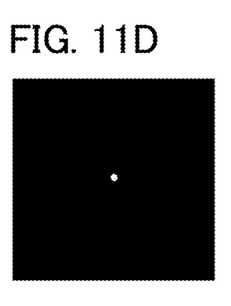
Figure 11E:
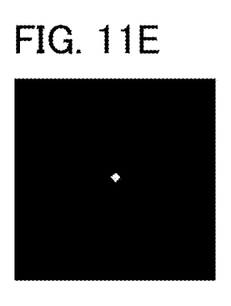
Figure 11F:
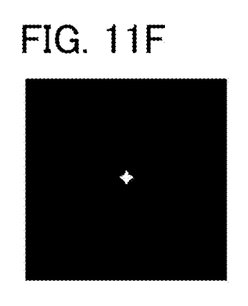
Figure 11G:
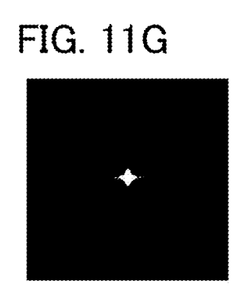
Figure 11H:
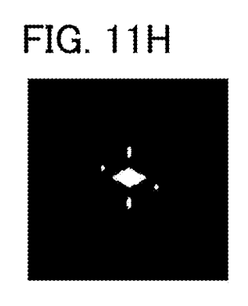

FIG. 11C is a diagram showing the output image I of the opening member 301 acquired through the sample 2. FIGS. 11D to 11H are diagrams showing the BRDF calculation values obtained when the value of the Wiener coefficient "c" is changed. FIG. 11D corresponds to $c=10^{-6}$, FIG. 11E corresponds to $c=10^{-5}$, FIG. 11F corresponds to $c=10^{-4}$, FIG. 11G corresponds to $c=10^{-3}$, and FIG. 11H corresponds to $c=10^{-2}$. Also in a case of FIGS. 11A to 11H, it can be seen that it is possible to realize the acquisition of the appropriate BRDF within a range of $10^{-6}$ to $10^{-3}$ (FIGS. 11D to 11G).

Figure 12A:
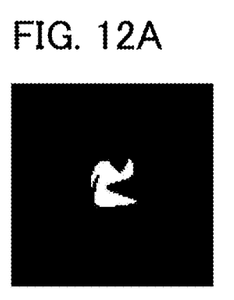
FIGS. 12A to 12H are diagrams showing an example of the BRDF acquisition result using an opening according to the second exemplary embodiment.
Figure 12B:
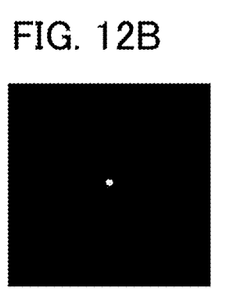

FIGS. 12A to 12H are diagrams showing an example of the BRDF acquisition result using the opening 401 (refer to FIG. 10B) according to the second exemplary embodiment. FIG. 12A is a diagram showing the opening image G reflecting the opening member 401. FIG. 12B is a diagram showing the BRDF of the sample 2.

Note that, also in a case of FIGS. 12A to 12H, the sample 2 used in a case of FIGS. 12A to 12H is the same as the sample 2 used in FIGS. 3 and 5 according to the first exemplar)/embodiment and FIGS. 11A to 11H according to the present exemplary embodiment. Therefore, the BRDF shown in FIG. 12B is the same as the BRDF of FIG. 3B and FIG. 5B according to the first exemplary embodiment and FIG. 11B according to the present exemplary embodiment.

Figure 12C:
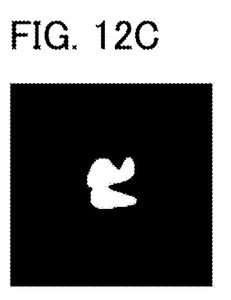
Figure 12D:
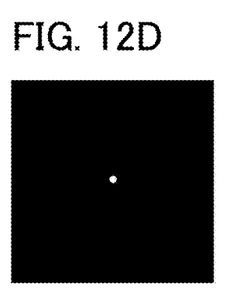
Figure 12E:
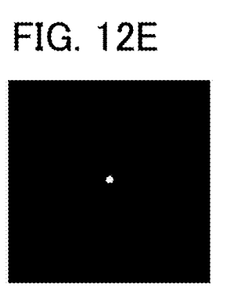
Figure 12F:
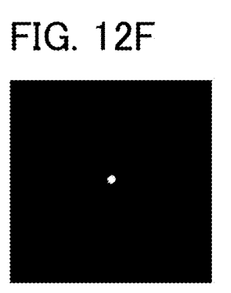
Figure 12G:
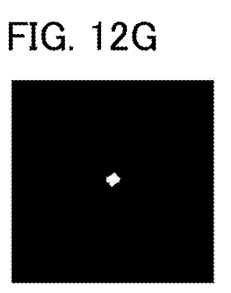
Figure 12H:
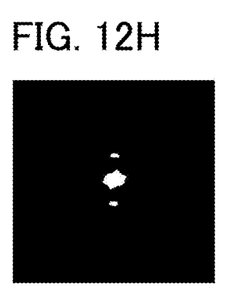

FIG. 12C is a diagram showing the output image I of the opening member 401 acquired through the sample 2. FIGS. 12D to 12H are diagrams showing the BRDF calculation values obtained when the value of the Wiener coefficient "c" is changed. FIG. 12D corresponds to $c=10^{-6}$, FIG. 12E corresponds to $c=10^{-5}$, FIG. 12F corresponds to $c=10^{-4}$, FIG. 12G corresponds to $c=10^{-3}$, and FIG. 12H corresponds to $c=10^{-2}$. Also in a case of FIGS. 12A to 12H, it can be seen that it is possible to realize the acquisition of the appropriate BRDF within a range of $10^{-6}$ to $10^{-3}$ (FIGS. 12D to 12G).

In each of the opening members 301 and 401, it can be seen that it is possible to realize the acquisition of the BRDF with a small error as compared with a case in which the simple rectangular opening of FIG. 3 is used in the opening member as the example according to the prior art in the description according to the first exemplary embodiment. This is because that also in a case of adopting the opening as in the present exemplary embodiment, there is an effect of suppressing the divergence in calculation of $G_{FFT}(m, n)$ of Expression (1) similarly to a case of the opening shown in the first exemplary embodiment.

In addition, also in a case of the present exemplary embodiment, similarly to the first exemplary embodiment, it is desirable that one opening having the non-line-symmetric shape is a more complicated opening, such as having an unevenness of different shapes. As described above, even with one opening, it is possible to obtain a highly robust BRDF by adopting a special shape.

Note that, also in a case of the present exemplary embodiment, similarly to the first exemplary embodiment, it is possible to apply the operation flow shown in FIG. 8 by fixing the Wiener coefficient. In this case as well, it is possible to reduce a process time by simplifying a calculation process.

OTHER EXEMPLARY EMBODIMENTS

Although the exemplary embodiments of the present invention have been described above, the present invention is not limited to these exemplary embodiments, and various modifications are possible within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-103054 filed May 30, 2018, which is hereby incorporated by reference herein in its entirety.

What is claimed is:

1. A measurement apparatus that measures an optical characteristic of a sample, the measurement apparatus comprising:
   an irradiation unit configured to irradiate the sample with light emitted from a light source and transmitted through an opening member;
   an imaging unit configured to detect an image formed by the light irradiated by the irradiation unit and reflected by the sample; and
   a processing unit configured to obtain a bidirectional reflectance distribution function of the sample on the basis of an output of the imaging unit,
   wherein the opening member includes a plurality of openings having shapes different from each other,
   an overall shape of the plurality of openings is asymmetric,
   the opening member and the imaging unit is optically conjugate with each other,
   the irradiation unit irradiates the sample with the light transmitted through the plurality of openings, and
   the imaging unit detects an image formed by the light transmitted through the plurality of openings and reflected by the sample.

2. The measurement apparatus according to claim 1, wherein a shape of one of the plurality of openings is a shape having five or more corners.

3. The measurement apparatus according to claim 1, wherein a shape of one of the plurality of openings is a triangle.

4. The measurement apparatus according to claim 1, wherein an overall shape of the plurality of openings is neither line symmetric nor point symmetric nor rotationally symmetric.

5. The measurement apparatus according to claim 1, wherein an overall shape of the plurality of openings is rotationally symmetric only in relation to two rotation angles of 180 degrees and 360 degrees.

6. The measurement apparatus according to claim 1, wherein an overall shape of the plurality of openings has one axis of line symmetry.

7. The measurement apparatus according to claim 1, wherein the processing unit determines a coefficient of a Wiener filter on the basis of an opening image of the opening member and a Fourier transform of the image, and obtains the bidirectional reflectance distribution on the basis of the Wiener filter of which the coefficient is determined and the Fourier transform.

8. The measurement apparatus according to claim 1, wherein the processing unit obtains the optical characteristic on the basis of a predetermined coefficient of a Wiener filter, an opening image of the opening member, and a Fourier transform of the image.

9. The measurement apparatus according to claim 1, wherein the irradiation unit and the imaging unit are oblique incidence optical system.

10. A measurement apparatus that measures an optical characteristic of a sample, the measurement apparatus comprising:
- an irradiation unit configured to irradiate the sample with light emitted from a light source and transmitted through an opening member;
- an imaging unit configured to detect an image formed by the light irradiated by the irradiation unit and reflected by the sample; and
- a processing unit configured to obtain a bidirectional reflectance distribution of the sample on the basis of an output of the imaging unit,
- wherein the opening member is provided with one opening having a nonlinearly symmetric planar shape that causes the light emitted from the light source to pass through the one opening,
- the opening member and the imaging unit is optically conjugate with each other,
- the irradiation unit irradiates the sample with the light transmitted through the one opening having the nonlinearly symmetric shape, and
- the imaging unit detects an image formed by the light transmitted through the one opening and reflected by the sample.

11. The measurement apparatus according to claim 10, wherein the one opening includes concave and convex shapes different from each other.

12. The measurement apparatus according to claim 10, wherein the one opening is a shape surrounded by a line segment.

13. The measurement apparatus according to claim 10, wherein the one opening includes a curve.

14. The measurement apparatus according to claim 10, wherein the one opening is neither point symmetric nor rotationally symmetric.

15. The measurement apparatus according to claim 10, wherein the irradiation unit and the imaging unit are oblique incidence optical system.

* * * * *